United States Patent
Takano et al.

(10) Patent No.: US 11,279,785 B2
(45) Date of Patent: Mar. 22, 2022

(54) PRODUCTION METHOD FOR COPOLYMER, COPOLYMER, RUBBER COMPOSITION, AND TIRE

(71) Applicant: BRIDGESTONE CORPORATION, Tokyo (JP)

(72) Inventors: Shigenaga Takano, Kodaira (JP); Shojiro Kaita, Tokyo (JP); Olivier Tardif, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 10 days.

(21) Appl. No.: 16/643,984

(22) PCT Filed: Aug. 28, 2018

(86) PCT No.: PCT/JP2018/031762
§ 371 (c)(1),
(2) Date: Mar. 3, 2020

(87) PCT Pub. No.: WO2019/044827
PCT Pub. Date: Mar. 7, 2019

(65) Prior Publication Data
US 2021/0061936 A1    Mar. 4, 2021

(30) Foreign Application Priority Data
Sep. 4, 2017   (JP) .............. JP2017-169623

(51) Int. Cl.
C08F 236/06   (2006.01)
B60C 1/00     (2006.01)
C08F 4/52     (2006.01)

(52) U.S. Cl.
CPC .............. C08F 236/06 (2013.01); B60C 1/00 (2013.01)

(58) Field of Classification Search
USPC ........................................ 526/281, 282, 283
See application file for complete search history.

(56) References Cited

U.S. PATENT DOCUMENTS

| | | | |
|---|---|---|---|
| 8,816,032 B1 * | 8/2014 | Flook | B60C 1/00 526/308 |
| 2005/0239639 A1 | 10/2005 | Monteil et al. | |
| 2013/0197157 A1 | 8/2013 | Kaita et al. | |
| 2017/0275400 A1 | 9/2017 | Hirata et al. | |
| 2018/0298118 A1 | 10/2018 | Yamagata et al. | |
| 2019/0161571 A1 | 5/2019 | Yamagata et al. | |

FOREIGN PATENT DOCUMENTS

| | | |
|---|---|---|
| EP | 1512700 A1 | 3/2005 |
| EP | 3184555 A1 | 6/2017 |
| JP | 2006-503141 A | 1/2006 |
| JP | 2008-001742 A | 1/2008 |
| JP | 2008-031270 A | 2/2008 |
| JP | 2008-266523 A | 11/2008 |
| JP | 2008-280384 A | 11/2008 |
| JP | 2013-035943 A | 2/2013 |
| WO | 2012/014455 A1 | 2/2012 |
| WO | 2016/027401 A1 | 2/2016 |
| WO | 2017094222 A1 | 6/2017 |
| WO | 2017/203830 A1 | 11/2017 |

OTHER PUBLICATIONS

Machine-generated translation of Description of JP 2008-280384A, retrieved from ESPACENET on May 7, 2021. (Year: 2008).*
Liu, et al, "Cationic Tropidinyl Scandium Catalyst: A Perfectly Acceptable Substitute for Cationic Half-Sandwich Scandium Catalysts in cis-1,4-Polymerization of Isoprene and Copolymerization with Norbornene," Macromolecules, 2014, 3567-3573. (Year: 2014).*
Suzuki, et al, "Random and block copolymerizations of norbornene with conjugated 1,3-dienes catalyzed by novel Ni compounds involving N- or O-donated ligands," Reactive & Functional Polymers 59 (2004) 253-266. (Year: 2004).*
International Preliminary Report on Patentability with translation of Written Opinion dated Mar. 10, 2020, in International Application No. PCT/JP2018/031762.
International Search Report for PCT/JP2018/031762 dated Nov. 20, 2018 [PCT/ISA/210].
Search Report dated May 25, 2021, from the European Patent Office in application No. 18850936.8.

* cited by examiner

Primary Examiner — Fred M Teskin
(74) Attorney, Agent, or Firm — Sughrue Mion, PLLC

(57)   ABSTRACT

It is an object of the disclosure to provide a production method for a copolymer in which a copolymer with a high content of cis-1,4 bonds of a conjugated diene portion can be obtained at a high yield even when a cyclic olefin compound is used as a monomer. In order to achieve the object, the present disclosure includes a step of polymerizing a conjugated diene compound and a cyclic olefin compound in the presence of a catalyst composition containing a rare-earth element compound represented by the following formula (I), at least one compound selected from the group consisting of an ionic compound and a halogen compound, a compound represented by the following formula (II), and a coordination compound that can be a ligand:

$$M\text{-}(AQ^1)(AQ^2)(AQ^3) \qquad (I)$$

$$YR^1_a R^2_b R^3_c \qquad (II).$$

16 Claims, No Drawings

PRODUCTION METHOD FOR COPOLYMER, COPOLYMER, RUBBER COMPOSITION, AND TIRE

CROSS REFERENCE TO RELATED APPLICATIONS

This application is a National Stage of International Application No. PCT/JP2018/031762 filed Aug. 28, 2018, claiming priority based on Japanese Patent Application No. 2017-169623 filed Sep. 4, 2017.

TECHNICAL FIELD

This disclosure relates to a production method for a copolymer, a copolymer, a rubber composition, and a tire.

BACKGROUND

Rubber products (such as tires, conveyor belts, vibration-insulating rubbers, and seismic isolation rubbers) are generally required to be improved in performance such as fracture resistance, wear resistance, and crack growth resistance. In order to meet such demand, various rubber components and rubber compositions have been developed.

For example, WO2012/014455A (PTL 1) discloses a method for producing, by coordinated anionic polymerization, a copolymer of a conjugated diene compound and a non-conjugated olefin in which the content of cis-1,4 bonds of a conjugated diene portion (units derived from the conjugated diene compound) is greater than 70.5 mol % and the content of the non-conjugated olefin is 10 mol % or more.

In a catalyst system used in conventional coordinated anionic polymerization, however, reactivity to an olefin monomer (particularly, a cyclic olefin monomer) is so low that it is difficult to efficiently obtain a copolymer containing cyclic olefin.

On the other hand, in the catalyst system used in the coordinated anionic polymerization, a geometric isomer structure of a polymer can be controlled by, for example, stereospecific polymerization, and therefore, reactions for generating various polymers utilizing the catalyst system have been reported. For example, National Publication of International Patent Application No. 2006-503141 (PTL 2) discloses, with respect to a copolymer of ethylene and butadiene, that the butadiene is inserted in the form of a trans-1,2 cyclohexane bond by using a metallocene complex as a polymerization catalyst.

CITATION LIST

Patent Literature

PTL 1: International Publication No. WO2012/014455
PTL 2: National Publication of International Patent Application No. 2006-503141

SUMMARY

Technical Problem

In none of production methods for a copolymer of conventional techniques, however, a copolymer with a high content of cis-1,4 bonds of a conjugated diene portion with excellent polymerization efficiency is obtained when a cyclic olefin compound is used as a monomer.

Hence, it is an object of the disclosure to provide a production method for a copolymer in which a copolymer with a high content of cis-1,4 bonds of a conjugated diene portion can be obtained at a high yield even when a cyclic olefin compound is used as a monomer, a copolymer with a high content of cis-1,4 bonds of a conjugated diene portion even when a cyclic olefin compound is contained as a monomer, and a rubber composition and a tire excellent in workability and durability.

The present inventors made earnest studies on process of polymerizing a conjugated diene compound and a cyclic olefin compound for achieving the above-described object. As a result, it was found that when polymerization is performed by using a catalyst composition containing a specific rare-earth element compound, a coordination compound or the like, reactivity to a cyclic olefin monomer can be increased, and hence a copolymer with a high content of cis-1,4 bonds of a conjugated diene portion can be obtained at a high yield. Thus, the present disclosure was accomplished.

Solution to Problem

A production method for a copolymer according to the present disclosure includes a step of polymerizing a conjugated diene compound and a cyclic olefin compound in the presence of a catalyst composition containing a rare-earth element compound represented by the following formula (I), at least one compound selected from the group consisting of an ionic compound and a halogen compound, a compound represented by the following formula (II), and a coordination compound that can be a ligand:

$$M\text{-}(AQ^1)(AQ^2)(AQ^3) \qquad (I)$$

wherein M represents scandium, yttrium or a lanthanoid element, $AQ^1$, $AQ^2$ and $AQ^3$ represent functional groups that may be the same as or different from one another, and A represents nitrogen, oxygen or sulfur, at least one M-A bond being contained;

$$YR^1_a R^2_b R^3_c \qquad (II)$$

wherein Y represents a metal selected from the groups 1, 2, 12, and 13 of the periodic table, $R^1$ and $R^2$ each represent a hydrocarbon group containing 1 to 10 carbon atoms or a hydrogen atom, and $R^3$ represents a hydrocarbon group containing 1 to 10 carbon atoms, wherein $R^1$, $R^2$ and $R^3$ may be the same as or different from one another, and when Y is a metal selected from the group 1 of the periodic table, a is 1 and b and c are 0, when Y is a metal selected from the groups 2 and 12 of the periodic table, a and b are 1 and c is 0, and when Y is a metal selected from the group 13 of the periodic table, a, b and c are 1.

Owing to the above described structure, a copolymer with a high content of cis-1,4 bonds of a conjugated diene portion can be obtained at a high yield even when a cyclic olefin compound is used as a monomer.

In the production method for a copolymer according to the disclosure, the coordination compound is a compound having a cyclopentadiene skeleton. This is because a copolymer with a higher content of cis-1,4 bonds of a conjugated diene portion can be thus obtained.

In the production method for a copolymer according to the disclosure, the compound having a cyclopentadiene skeleton is more preferably a compound selected from substituted or unsubstituted cyclopentadiene, substituted or unsubstituted indene, and substituted or unsubstituted fluorene. This is because a copolymer with a higher content of cis-1,4 bonds of a conjugated diene portion can be thus obtained.

In the production method for a copolymer according to the disclosure, the compound having a cyclopentadiene skeleton is more preferably a substituted phenylindenyl compound. This is because a copolymer with a higher content of cis-1,4 bonds of a conjugated diene portion can be thus obtained.

In the production method for a copolymer according to the disclosure, the cyclic olefin compound is preferably at least one selected from the group consisting of norbornene, dicyclopentadiene, norbornadiene, cyclohexene and ethylidene norbornene. This is because the compound can be thus efficiently polymerized with the conjugated diene compound.

Further, in the production method for a copolymer according to the disclosure, the conjugated diene compound is preferably 1,3-butadiene. This is because a copolymer with a higher content of cis-1,4 bonds of a conjugated diene portion can be thus obtained.

A copolymer of the present disclosure is characterized in that it is produced by the above-described production method. Owing to the above-described structure, a copolymer with a high content of cis-1,4 bonds of a conjugated diene portion can be obtained even if a cyclic olefin compound is contained as a monomer.

In the copolymer according to the disclosure, the content of cis-1,4 bonds in entire units derived from the conjugated diene compound is preferably 90% or more. Thus, when the copolymer is used in a rubber composition, a tire or the like, durability such as crack growth resistance and wear resistance can be further improved.

A rubber composition according to the present disclosure is characterized in that it comprises a rubber component containing the copolymer according to the disclosure.

Owing to the above described structure, the rubber composition of the disclosure can realize excellent durability with good workability retained.

A tire according to the present disclosure is characterized in that it uses the rubber composition according to the disclosure.

Owing to the above described structure, the tire of the disclosure can realize excellent durability with good workability retained.

Advantageous Effect

According to the present disclosure, a production method for a copolymer in which a copolymer with a high content of cis-1,4 bonds of a conjugated diene portion can be obtained at a high yield even when a cyclic olefin compound is used as a monomer, a copolymer with a high content of cis-1,4 bonds of a conjugated diene portion even when a cyclic olefin compound is contained as a monomer, and a rubber composition and a tire excellent in workability and durability can be provided.

DETAILED DESCRIPTION

Hereinafter, the disclosure will be illustrated and described in detail based on the embodiments thereof.
<Production Method for Copolymer>

A production method for a copolymer according to the present disclosure includes: a step of polymerizing a conjugated diene compound and a cyclic olefin compound in the presence of a catalyst composition containing a rare-earth element compound represented by the following formula (I) (hereinafter also referred to as the "component (A)"), at least one compound selected from the group consisting of an ionic compound and a halogen compound (hereinafter also referred to as the "component (B)"), a compound represented by the following formula (II) (hereinafter also referred to as the "component (C)"), and a coordination compound that can be a ligand (hereinafter also referred to as the "component (D)"):

$$M\text{-}(AQ^1)(AQ^2)(AQ^3) \qquad (I)$$

wherein M represents scandium, yttrium or a lanthanoid element, $AQ^1$, $AQ^2$ and $AQ^3$ represent functional groups that may be the same as or different from one another, and A represents nitrogen, oxygen or sulfur, at least one M-A bond being contained;

$$YR^1_a R^2_b R^3_c \qquad (II)$$

wherein Y represents a metal selected from the groups 1, 2, 12, and 13 of the periodic table, $R^1$ and $R^2$ each represent a hydrocarbon group containing 1 to 10 carbon atoms or a hydrogen atom, and $R^3$ represents a hydrocarbon group containing 1 to 10 carbon atoms, wherein $R^1$, $R^2$ and $R^3$ may be the same as or different from one another, and when Y is a metal selected from the group 1 of the periodic table, a is 1 and b and c are 0, when Y is a metal selected from the groups 2 and 12 of the periodic table, a and b are 1 and c is 0, and when Y is a metal selected from the group 13 of the periodic table, a, b and c are 1.

In the production method for a copolymer according to the present disclosure, since the catalyst composition is used, the reactivity of a cyclic olefin monomer, which was difficult to increase in using a conventional catalyst composition, can be increased. As a result, a copolymer of a conjugated diene compound and a cyclic olefin compound can be obtained at a high yield, and the content of cis-1,4 bonds of a conjugated diene portion of the thus obtained copolymer can be increased.

Moreover, in the production method for a copolymer according to the present disclosure, a polymerization reaction of the cyclic olefin monomer can be performed not as ring opening metathesis polymerization as in conventional techniques but as vinyl addition polymerization not accompanying ring opening of the cyclic olefin compound.

(Conjugated Diene Compound)

In the present description, the "conjugated diene compound" indicates a conjugated-system diene compound. The conjugated diene compound used as a monomer in the production method of the present disclosure is not particularly limited, and preferably contains 4 to 8 carbon atoms. Specific examples of such a conjugated diene compound include 1,3-butadiene, isoprene, 1,3-pentadiene, and 2,3-dimethylbutadiene, and among these, 1,3-butadiene is preferable. This is because the content of cis-1,4 bonds of a conjugated diene portion is high, and hence the durability of a rubber composition, a tire or the like using the produced copolymer can be effectively improved.

(Cyclic Olefin Compound)

In the present description, the "cyclic olefin compound" indicates a cyclic unsaturated aliphatic hydrocarbon compound having one or more carbon-carbon double bonds, in which the diene-based compounds are not included.

In the production method according to the present disclosure, the cyclic olefin compound used as a monomer is not particularly limited. For example, cyclic olefin compounds containing 3 or more carbon atoms can be used. Among these, as the cyclic olefin compound, at least one selected from the group consisting of norbornene, dicyclopentadiene, norbornadiene, cyclohexene and ethylidene norbornene is preferably used, and norbornene is more preferably used. This is because such a compound can efficiently polymerize with the conjugated diene compound. Moreover, when a copolymer obtained by using such a compound as a monomer is contained in a rubber composition, not only wetting properties but also durability such as fracture resistance, wear resistance and crack growth resistance can be further improved.

(Catalyst Composition)

The catalyst composition used in the production method for a copolymer according to the present disclosure contains the following components (A) to (D):

Component (A): Rare-earth element compound represented by the following formula (I)

$$M\text{-}(AQ^1)(AQ^2)(AQ^3) \quad (I)$$

wherein M represents scandium, yttrium or a lanthanoid element, $AQ^1$, $AQ^2$ and $AQ^3$ represent functional groups that may be the same as or different from one another, and A represents nitrogen, oxygen or sulfur, at least one M-A bond being contained.

Herein, the lanthanoid element is specifically lanthanium, cerium, praseodymium, neodymium, promethium, samarium, europium, gadolinium, terbium, dysprosium, holmium, erbium, thulium, ytterbium or lutetium. The component (A) contains at least one M-A bond. Moreover, the component (A) is a component capable of improving catalytic activity in the reaction system, shortening the reaction time, and increasing the reaction temperature.

Moreover, M described above is particularly preferably gadolinium from the viewpoint of increasing catalytic activity and reaction controllability.

It is noted that the component (A) may be either a single type of component (A) or a combination of two or more types of components (A).

The compound represented by the formula (I) contains at least one M-A bond. Since the compound has one or more M-A bonds and these bonds are chemically equivalent to one another, the compound has a stable structure and thus it is easily treated. Therefore, the copolymer can be efficiently produced at low cost. It is noted that the compound represented by the formula (I) can contain, in addition to the M-A bonds, another bond such as a bond between a metal other than M described above and a hetero atom such as O or S.

When A is nitrogen in the formula (I), the functional groups represented by $AQ^1$, $AQ^2$ and $AQ^3$ (namely, $NQ^1$, $NQ^2$ and $NQ^3$) may be an amide group or the like.

Examples of the amide group include aliphatic amide groups such as a dimethylamide group, a diethylamide group or a diisopropylamide group; arylamide groups such as a phenylamide group, a 2,6-di-tert-butylphenylamide group, a 2,6-diisopropylphenylamide group, a 2,6-dineopentylphenylamide group, a 2-tert-butyl-6-isopropylphenylamide group, a 2-tert-butyl-6-neopentylphenylamide group, a 2-isopropyl-6-neopentylphenylamide group, or a 2,4,6-tert-butylphenylamide group; and bistrialkylsilylamide groups such as a bistrimethylsilylamide group. Among these groups, a bistrimethylsilylamide group is preferable particularly from the viewpoint of solubility in aliphatic hydrocarbon.

The functional group may be either a single type of functional group or a combination of two or more types of functional groups.

When A is oxygen in the formula (I), the functional groups represented by $AQ^1$, $AQ^2$ and $AQ^3$ (namely, $OQ^1$, $OQ^2$ and $OQ^3$) may be, for example, an alkoxy group, an acyloxy group, or an alkoxycarboxyl group. As the alkoxy group, a methoxy group, an ethoxy group, an isopropoxy group or the like is preferable. Moreover, as the acyloxy group, an acetoxy group, a valeroyl group, a pivaloxy group or the like is preferable.

When A is sulfur in the formula (I), the functional groups represented by $AQ^1$, $AQ^2$ and $AQ^3$ (namely, $SQ^1$, $SQ^2$ and $SQ^3$) may be, for example, an alkylthio group, an alkylsulfonyl group or the like. As the alkylthio group, a methylthio group, an isopropylthio group or the like is preferable. Moreover, as the alkylsulfonyl group, a phenylsulfonyl group, an isopropanesulfonyl group, a hexanesulfonyl group or the like is preferable.

It is noted that the concentration of the component (A) contained in the catalyst composition in the polymerization reaction system is preferably in the range of 0.1 to 0.0001 mol/l.

Component (B): At least one compound selected from the group consisting of ionic compound (B-1) and halogen compound (B-2)

It is noted that the total content of the components (B) in the catalyst composition is preferably 0.1 to 50 times mol based on the component (A).

The ionic compound (B-1) is an ionic compound consisting of a non-coordinating anion and a cation, and may be an ionic compound capable of generating a cationic transition metal compound by reacting with the rare-earth element compound of the component (A).

Herein, examples of the non-coordinating anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl,pentafluorophenyl)borate, [tris(pentafluorophenyl),phenyl] borate, and tridecahydride-7,8-dicarbaundecaborate. On the other hand, examples of the cation include a carbonium cation, an oxonium cation, an ammonium cation, a phosphonium cation, a cycloheptatrienyl cation, and a ferrocenium cation having a transition metal. Specific examples of the carbonium cation include tri-substituted carbonium cations such as a triphenylcarbonium cation or a tri(substituted phenyl) carbonium cation. More specifically, examples of the tri (substituted phenyl)carbonium cation include a tri(methylphenyl)carbonium cation and a tri(dimethylphenyl) carbonium cation. Specific examples of the ammonium cation include: trialkylammonium cations such as a trimethylammonium cation, a triethylammonium cation, a tripropylammonium cation, or a tributylammonium cation (e.g., a tri(n-butyl)ammonium cation); N,N-dialkylanilinium cations such as an N,N-dimethylanilinium cation, an N,N-diethylanilinium cation, or an N,N-2,4,6-pentamethylanilinium cation; and dialkylammonium cations such as a diisopropylammonium cation or a dicyclohexylammonium cation. Specific examples of the phosphonium cation include triarylphosphonium cations such as a triphenylphosphonium cation, a tri(methylphenyl)phosphonium cation, or a tri (dimethylphenyl)phosphonium cation. Accordingly, the ionic compound is preferably a compound in which a non-coordinating anion and a cation are selected from the aforementioned non-coordinating anions and cations and are combined with each other. Specifically, N,N-dimethylanilinium tetrakis(pentafluorophenyl)borate, triphenylcarbonium tetrakis(pentafluorophenyl)borate, and the like are preferable. Moreover, these ionic compounds can be used singly or in combinations of two or more.

It is noted that the total content of the ionic compounds (B-1) in the catalyst composition is preferably 0.1 to 10 times mol, more preferably 0.1 to 5 times mol, further preferably 0.5 to 5 times mol, particularly preferably 0.7 to 3 times mol, and most preferably approximately 1 time mol, based on the component (A).

The halogen compound (B-2) is at least one of Lewis acid, a complex compound of a metal halide and a Lewis base, and an organic compound comprising active halogen, and it reacts with the rare-earth element compound of the component (A), so as to generate a cationic transition metal compound, a halogenated transition metal compound, or a compound having a transition metal center with lack of electric charge.

The total content of the halogen compound (B-2) in the catalyst composition is preferably 1 to 5 times mol based on the component (A).

As the Lewis acid, boron-containing halogen compounds such as $B(C_6F_5)_3$, or aluminum-containing halogen compounds such as $Al(C_6F_5)_3$, can be used. In addition, halogen compounds containing an element belonging to the group 3, 4, 5, 6 or 8 of the periodic table can also be used. Preferably, an aluminum halide or an organic metal halide can be used. As the halogen element, chlorine or bromine is preferable. Specific examples of the above described Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, and tungsten hexachloride. Among these substances, diethylaluminum chloride, ethylaluminum sesquichloride, ethylaluminum dichloride, diethylaluminum bromide, ethylaluminum sesquibromide, and ethylaluminum dibromide are particularly preferable.

Examples of the metal halide constituting the complex compound of the metal halide and the Lewis base include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold iodide, and gold bromide. Among these substances, magnesium chloride, calcium chloride, barium chloride, manganese chloride, zinc chloride, and copper chloride are preferable, and magnesium chloride, manganese chloride, zinc chloride, and copper chloride are particularly preferable.

Moreover, examples of the Lewis base constituting the complex compound of the metal halide and the Lewis base include a phosphorus compound, a carbonyl compound, a nitrogen compound, an ether compound, and alcohol. Specific examples include tributyl phosphate, tri-2-ethylhexyl phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrile acetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, and lauryl alcohol. Among these substances, tri-2-ethylhexyl phosphate, tricresyl phosphate, acetylacetone, 2-ethylhexanoic acid, versatic acid, 2-ethylhexyl alcohol, 1-decanol, and lauryl alcohol are preferable.

The Lewis base is allowed to react with the above described metal halide at a ratio of 0.01 to 30 mol, and preferably of 0.5 to 10 mol, based on 1 mol of the metal halide. Using a reaction product of the rare-earth element compound with this Lewis base, the amount of a metal remaining in the polymer can be reduced.

An example of the organic compound comprising active halogen is benzyl chloride.

Component (C): Compound represented by the following formula (II)

$$YR^1_a R^2_b R^3_c \quad (II)$$

wherein Y represents a metal selected from the groups 1, 2, 12, and 13 of the periodic table, $R^1$ and $R^2$ each represent a hydrocarbon group containing 1 to 10 carbon atoms or a hydrogen atom, and $R^3$ represents a hydrocarbon group containing 1 to 10 carbon atoms, wherein $R^1$, $R^2$ and $R^3$ may be the same as or different from one another, and when Y is a metal selected from the group 1 of the periodic table, a is 1 and b and c are 0, when Y is a metal selected from the groups 2 and 12 of the periodic table, a and b are 1 and c is 0, and when Y is a metal selected from the group 13 of the periodic table, a, b and c are 1.

Since the ionic compound (B-1) and the halogen compound (B-2) do not contain carbon atoms to be supplied to the component (A), these compounds need the above described component (C) as a source for supplying carbon to the component (A).

Moreover, the component (C) is a compound represented by the formula (II), and is preferably an organic aluminum compound represented by the following formula (III) from the viewpoint that a copolymer with a higher content of cis-1,4 bonds can be synthesized at a high yield:

$$AlR^1 R^2 R^3 \quad (III)$$

wherein $R^1$ and $R^2$ each represent a hydrocarbon group containing 1 to 10 carbon atoms or a hydrogen atom, and $R^3$ represents a hydrocarbon group containing 1 to 10 carbon atoms, wherein $R^1$, $R^2$ and $R^3$ may be the same as or different from one another.

Examples of the organic aluminum compound represented by the formula (III) include: trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, and diisooctylaluminum hydride; and ethylaluminum dihydride, n-propylaluminum dihydride, and isobutylaluminum dihydride. Among these substances, trimethylaluminum, triethylaluminum, triisobutylaluminum, diethylaluminum hydride, and diisobutylaluminum hydride are preferable. The aforementioned organic aluminum compound as component (C) can be used singly or in combinations of two or more.

It is noted that the content of the organic aluminum compound in the catalyst composition is preferably 1 to 50 times mol, more preferably 5 to 40 times mol, further preferably 5 to 30 times mol, particularly preferably 5 to 20 times mol, and most preferably approximately 10 times mol, based on the component (A).

Component (D): Coordination compound that can be ligand

The component (D) is a coordination compound exchangeable with the amide group or the like of the component (A), and when the catalyst composition contains the coordination compound, a copolymer with a high content of cis-1,4 bonds can be synthesized at a high yield. The coordination compound is not particularly limited, and for example, has any one of an OH group, a NH group and a SH group.

Specific examples of a coordination compound having the OH group include aliphatic alcohol and aromatic alcohol. Specific examples of such a compound include 2-ethyl-1-hexanol, dibutylhydroxytoluene, alkylated phenol, 4,4'-thiobis-(6-t-butyl-3-methylphenol), 4,4'-butylidenebis-(6-t-butyl-3-methylphenol), 2,2'-methylenebis-(4-methyl-6-t-butylphenol), 2,2'-methylenebis-(4-ethyl-6-t-butylphenol), 2,6-di-t-4-ethylphenol, 1,1,3-tris-(2-methyl-4-hydroxy-5-t-butylphenyl)butane, n-octadecyl-3-(4-hydroxy-3,5-di-t-butylphenyl)propionate, tetrakis[methylene-3-(3,5-di-t-butyl-4-hydroxyphenyl)propionate]methane, dilaurylthiodipropionate, distearylthiodipropionate, and dimyristylylthiopropionate, but the examples are not limited thereto. For example, hindered phenol-based compounds may include triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, pentaerythryl-tetrakis[3-(3,5-di-t-butyl-4-hydroxyphenyl)propionate], 2,2-thio-diethylene-bis[3-(3,5-di-t-butyl-4-hydroxyphenyl)propionate], octadecyl-3-(3,5-di-t-butyl-4-hydroxyphenyl)propionate, N,N'-hexamethylene bis(3,5-di-t-butyl-4-hydroxy-hydrocinnamamide), 3,5-t-butyl-4-hydroxybenzyl phosphonate-diethyl ester, 1,3,5-trimethyl-2,4,6-tris(3,5-di-t-butyl-4-hydroxybenzyl)benzene, tris-(3,5-di-t-butyl-4-hydroxybenzyl)-isocyanurate, octylated diphenylamine, and 2,4-bis[(octylthio)methyl]-o-cresol. Moreover, an example of a hydrazine-based compound may be N,N'-bis[3-(3,5-di-t-butyl-4-hydroxyphenyl)propionyl] hydrazine.

Examples of a coordination compound having the NH group include primary amines and secondary amines, such as alkylamine or arylamine. Specific examples include dimethylamine, diethylamine, pyrrole, ethanolamine, diethanolamine, dicyclohexylamine, N,N'-dibenzylethylenediamine, and bis(2-diphenylphosphinophenyl)amine.

Examples of the coordination compound having a SH group include aliphatic thiol, aromatic thiol, and compounds represented by the following formulae (VI) and (VII):

[Chemical Formula 1]

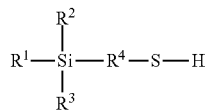

(VI)

(in the formula, $R^1$, $R^2$ and $R^3$ are each independently represented by $-O-C_jH_{2j+1}$, $-(O-C_kH_{2k}-)_a-O-C_mH_{2m+1}$, or $-C_nH_{2n+1}$, wherein at least one of $R^1$, $R^2$ and $R^3$ is $-(O-C_kH_{2k}-)_a-O-C_mH_{2m+1}$, j, m and n each independently represent 0 to 12, k and a each independently represent 1 to 12, and $R^4$ represents a linear, branched or cyclic, saturated or unsaturated alkylene group, cycloalkylene group, cycloalkylalkylene group, cycloalkenylalkylene group, alkenylene group, cycloalkenylene group, cycloalkylalkenylene group, cycloalkenylalkenylene group, arylene group or aralkylene group, containing 1 to 12 carbon atoms).

Specific examples of the coordination compound represented by the above formula (VI) include 3-mercaptopropyltrimethoxysilane, 3-mercaptopropyltriethoxysilane, 3-mercaptopropylmethyldimethoxysilane, (mercaptomethyl)dimethylethoxysilane, and (mercaptomethyl)trimethoxysilane:

[Chemical Formula 2]

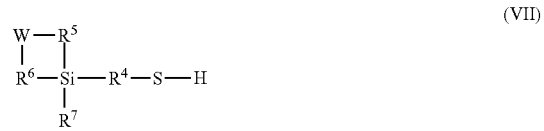

(VII)

(in the formula, W represents $-NR^8-$, $-O-$, or $-CR^9R^{10}-$ (wherein $R^8$ and $R^9$ represent $-C_pH_{2p+1}$, $R^{10}$ represents $-C_qH_{2q+1}$, and p and q each independently represent 0 to 20), $R^5$ and $R^6$ each independently represent $-M-C_rH_{2r}-$ (wherein M represents $-O-$ or $-CH_2-$, and r represents 1 to 20), $R^7$ represents $-O-C_jH_{2j+1}$, $-(O-C_kH_{2k}-)_a-O-C_mH_{2m+1}$, or $-C_nH_{2n+1}$, j, m and n each independently represent 0 to 12, k and a each independently represent 1 to 12, and $R^4$ represents a linear, branched or cyclic, saturated or unsaturated alkylene group, cycloalkylene group, cycloalkylalkylene group, cycloalkenylalkylene group, alkenylene group, cycloalkenylene group, cycloalkylalkenylene group, cycloalkenylalkenylene group, arylene group or aralkylene group, containing 1 to 12 carbon atoms).

Specific examples of the compound represented by the formula (VII) include 3-mercaptopropyl(ethoxy)-1,3-dioxa-6-methylaza-2-silacyclooctane, 3-mercaptopropyl(ethoxy)-1,3-dioxa-6-butylaza-2-silacyclooctane, and 3-mercaptopropyl (ethoxy)-1,3-dioxa-6-dodecylaza-2-silacyclooctane.

The coordination compound of the component (D) is preferably a compound having a cyclopentadiene skeleton.

Further, the compound having a cyclopentadiene skeleton is not particularly limited as long as it has a cyclopentadiene skeleton, and is more preferably a compound having an indenyl group from the viewpoint that higher catalytic activity can be thus obtained. This is because the catalytic activity can be further increased without using toluene or the like as a solvent in the polymerization.

Moreover, the compound having a cyclopentadiene skeleton is preferably selected from substituted or unsubstituted cyclopentadiene, substituted or unsubstituted indene, and substituted or unsubstituted fluorene. This is because a copolymer with a higher content of cis-1,4 bonds of a conjugated diene portion can be thus obtained.

Herein, examples of the compound having an indenyl group include indene, 1-methylindene, 2-ethylindene, 1-benzylindene, 2-phenylindene, 2-methylindene, 2-ethylindene, 2-benzylindene, 3-methylindene, 3-ethylindene, and 3-benzylindene, and among these, a substituted phenylindenyl compound is more preferably used.

It is noted that the component (D) is preferably added in an amount of 0.01 to 10 mol, and particularly, of 0.1 to 1.2 mol, to 1 mol of the rare-earth element compound of the component (A). When the additive amount is less than 0.01 mol, it is apprehended that polymerization of monomers do not sufficiently progress. The additive amount is preferably an equivalent amount (1.0 mol) to the rare-earth element compound, but the component may be excessively added. However, if the additive amount is set at larger than 10 mol, it causes the great loss of the reagent, and thus, it is not preferable.

It is noted that the catalyst composition may include another component such as a co-catalyst, which is contained in a general rare-earth element compound-based catalyst composition.

(Polymerization Step and Other Steps)

The production method for a copolymer according to the present disclosure includes a step of polymerizing the conjugated diene compound and the cyclic olefin compound in the presence of the catalyst composition (hereinafter also referred to as the "polymerization step"), and may further include other steps such as a coupling step and a cleaning step as necessary.

As a polymerization method in the polymerization step, any given methods, such as a solution polymerization method, a suspension polymerization method, a liquid phase bulk polymerization method, an emulsion polymerization method, a gas phase polymerization method, or a solid phase polymerization method, can be used. In addition, when a solvent is used in the polymerization reaction, the solvent may be any one inactive in the polymerization reaction. Examples of such a solvent include cyclohexane, normal hexane and toluene.

Moreover, since the conjugated diene compound has higher reactivity than the cyclic olefin compound in the presence of the catalyst composition, when an order of adding the conjugated diene compound is controlled, the contents of bonds (such as the content of cis-1,4 bonds, the content of trans-1,4 bonds, the content of 3,4-vinyl bonds and the content of 1,2-vinyl bonds) in the entire units derived from the conjugated diene compound in a copolymer produced, and the content of a unit derived from each monomer (namely, a copolymerization ratio of each monomer) can be controlled. For example, when the polymerization step is performed in multiple stages with the conjugated diene compound added at the first polymerization stage, a block length of a unit derived from the conjugated diene compound becomes long, and as a result, a copolymer having block alignment is obtained. On the other hand, when the polymerization step is performed in multiple stages with the conjugated diene compound added at the second or later polymerization stage, a block length of a unit derived from the conjugated diene compound becomes short, and as a result, a copolymer having more random alignment is obtained.

In the production method according to the disclosure, the polymerization step is preferably carried out in an inert gas atmosphere, and preferably in a nitrogen gas or argon gas atmosphere. The polymerization temperature employed in the polymerization step is not particularly limited, and for example, it is preferably in the range of −100 to 200° C., and can also be set at approximately room temperature. If the polymerization temperature is increased, the cis-1,4 selectivity of the polymerization reaction may be decreased. The pressure applied in the polymerization step is preferably in the range of 0.1 to 10.0 MPa for incorporating the cyclic olefin compound sufficiently into the polymerization reaction system. The reaction time required for the polymerization step is not particularly limited, and for example, it is in the range of 1 second to 10 days. The reaction time can be selected, as appropriate, depending on conditions such as desired microstructure of a copolymer to be obtained, the types, adding amounts and adding orders of the monomers, the type of the catalyst and the polymerization temperature. In the polymerization step, polymerization may be terminated by using a polymerization terminator such as methanol, ethanol or isopropanol.

The coupling step is for performing reaction (coupling reaction) to modify at least a part (for example, a terminal end) of a polymer chain of the copolymer obtained in the polymerization step. In a coupling step, the coupling reaction may preferably be performed when the polymerization reaction has reached 100%.

The coupling agent used in the coupling reaction is not particularly limited and may be selected as appropriate depending on purpose. Examples thereof may include: a tin-containing compound such as bis(maleic acid-1-octadecyl)dioctyltin; an isocyanate compound such as 4,4'-diphenylmethane diisocyanate; and an alkoxysilane compound such as glycidylpropyltrimethoxysilane, which may be used alone or in combination of two or more kinds thereof, with bis(maleic acid-1-octadecyl)dioctyltin being preferred in terms of the reaction efficiency and low gel formation.

The coupling reaction thus performed may increase the number-average molecular weight (Mn).

The cleaning step is for cleaning the copolymer obtained in the polymerization step. Here, the medium to be used in the cleaning is not particularly limited, and may be selected as appropriate depending on purpose. Examples thereof may include methanol, ethanol, and isopropanol. These solvents may be added with an acid (such as hydrochloric acid, sulfuric acid, nitric acid) when using Lewis acid catalyst as the polymerization catalyst. The amount of acid to be added may preferably be 15 mol % or less to the solvent. The acid will remain in the copolymer when added in an amount exceeding 15 mol %, which may affect the reaction at kneading and vulcanization.

The cleaning step can suitably reduce catalyst residue in the copolymer.

It can be checked whether or not a copolymer has been obtained by the production method according to the present disclosure by subjecting a polymerization product to a method such as gel permeation chromatography (GPC), $^1$H-NMR or $^{13}$C-NMR.

<Copolymer>

A copolymer of the present disclosure is characterized in that it is produced by the production method for a copolymer of the disclosure described above.

The copolymer obtained by the production method for a copolymer of the present disclosure has a high content of cis-1,4 bonds of a conjugated diene portion even when a cyclic olefin compound is contained as a monomer component. Moreover, in the copolymer of the present disclosure, the cyclic olefin compound is not ring-opened but addition polymerized.

The physical properties and the microstructure of the copolymer of the present disclosure can be identified by using methods such as differential scanning calorimetry (DSC), $^1$H-NMR, $^{13}$C-NMR and gel permeation chromatography (GPC). Specifically, the melting point (° C.) can be obtained by DSC. The content and ratio of a unit derived from each monomer component, and the content of cis-1,4 bonds, the content of trans-1,4 bonds and the content of 1,2-vinyl bonds in the entire units derived from the conjugated diene compound can be obtained by $^1$H-NMR and $^{13}$C-NMR. The weight-average molecular weight and the molecular weight distribution can be obtained by gel permeation chromatography (GPC) using polystyrene as a standard substance. The chain structure can be identified based on the physical properties and the microstructure identified by using DSC, $^1$H-NMR, $^{13}$C-NMR and GPC.

Moreover, in the copolymer of the present disclosure, the content of cis-1,4 bonds in the entire units derived from the conjugated diene compound is preferably 50% or more, more preferably 70% or more, and particularly preferably 90% or more.

When the content of cis-1,4-bonds in the entire units derived from the conjugated diene compound is 50% or more, the glass transition temperature is lowered, so that the durability such as crack growth resistance or wear resistance can be effectively improved when the obtained copolymer is used in a rubber composition, a tire or the like. On the other hand, the content of trans-1,4 bonds and the content of 1,2-vinyl bonds in the entire units derived from the conjugated diene compound are not particularly limited, and are both preferably 50% or less, and more preferably 30% or less.

In the copolymer of the present disclosure, the glass transition temperature ($T_g$) is preferably −60° C. or less, more preferably −70° C. or less, further preferably −80° C. or less, and particularly preferably −90° C. or less. In these cases, a rubber composition, a tire or the like using such a copolymer can be produced with high workability, and in addition, the durability and the weather resistance of the rubber composition, the tire or the like can be increased.

In the copolymer of the present disclosure, the content of the unit derived from the conjugated diene compound is preferably 1 to 99 mol %, more preferably 5 to 95 mol %, further preferably 10 to 95 mol %, still further preferably 20 to 95 mol %, further more preferably 30 to 95 mol %, still further more preferably 40 to 95 mol %, particularly preferably 50 to 95 mol %, and most preferably 60 to 95 mol %. When the content of the unit derived from the conjugated diene compound is 1 mol % or more, it becomes possible for the obtained copolymer to uniformly behave as an elastomer, and thus, higher durability can be obtained. On the other hand, when it is 99 mol % or less, sufficient effects can be obtained by using the cyclic olefin compound.

In the copolymer of the present disclosure, the content of the unit derived from the cyclic olefin compound is preferably 1 to 99 mol %, more preferably 5 to 95 mol %, further preferably 5 to 90 mol %, further more preferably 5 to 80 mol %, still further more preferably 5 to 70 mol %, much more preferably 5 to 60 mol %, particularly preferably 5 to 50 mol %, and most preferably 5 to 40 mol %. If the content of the unit derived from the cyclic olefin compound is 1 mol % or more, the obtained copolymer can obtain higher durability. On the other hand, when it is 99 mol % or less, sufficient effects can be obtained by using the conjugated diene compound.

The copolymer of the disclosure has a weight average molecular weight (Mw) relative to polystyrene standards of, preferably 10,000 to 10,000,000, more preferably 100,000 to 9,000,000, and particularly preferably 150,000 to 8,000,000. By setting the above described Mw of the copolymer at 10,000 or more, sufficient mechanical strength as a raw material for rubber products can be ensured. On the other hand, by setting the Mw at 10,000,000 or less, high workability can be retained.

Moreover, the copolymer of the disclosure has a molecular weight distribution (Mw/Mn), which is indicated as the ratio between the weight average molecular weight (Mw) and the number average molecular weight (Mn), of preferably 10.0 or less, more preferably 9.0 or less, and particularly preferably 8.0 or less. By setting the above described molecular weight distribution of the copolymer at 10.0 or less, sufficient homogeneity can be provided to the physical properties of the copolymer.

The chain structure of the copolymer of the disclosure is not particularly limited, and it can be selected, as appropriate, depending on purpose. For example, the copolymer can be a block copolymer, a random copolymer, or a tapered copolymer formed by mixing the random copolymer with the block copolymer.

<Rubber Composition>

A rubber composition according to the present disclosure is characterized in that it comprises the above described copolymer of the present disclosure as a rubber component. Since the copolymer of the disclosure is comprised as the rubber component, the rubber composition not only has good processability but also can be improved in the durability such as crack growth resistance and wear resistance. Moreover, the rubber composition of the disclosure may further include, as necessary, a rubber component other than the copolymer of the disclosure (another rubber component), a filler, a crosslinking agent and other components.

Here, the other rubber components may be selected as appropriate depending on purpose, and examples thereof may include, without being particularly limited thereto, polyisoprene, butadiene rubber (BR), acrylonitrile-butadiene rubber (NBR), chloroprene rubber, ethylene-propylene rubber (EPM), ethylene-propylene-non-conjugated diene rubber (EPDM), polysulfide rubber, silicone rubber, fluororubber, and urethane rubber, which may be used alone or in combination of two or more kinds thereof.

Further, the rubber composition of the present disclosure may use a filler as needed for the purpose of improving reinforcement or the like. The amount of the filler to be compounded is not particularly limited, and may be selected depending on purpose, which may be in an amount of preferably 10 to 100 parts by mass, more preferably 20 to 80 parts by mass, particularly preferably 30 to 60 parts by mass per 100 parts by mass of the rubber component. The filler compounded in an amount of 10 parts by mass or more provides an effect of improving reinforcement through the compounding of the filler, and the filler compounded in an amount of 100 parts by mass or less can maintain favorable workability while avoiding significant reduction in low loss property.

Examples of the filler may include, without being particularly limited thereto, carbon black, silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate, with the use of carbon black being preferred. These may be compounded alone or in combination of two or more kinds thereof.

Examples of the carbon black may be selected as appropriate depending on purpose without being particularly limited, and may include, for example, FEF, GPF, SRF, HAF, N339, IISAF, ISAF, SAF, which may be used alone or in combination of two or more kinds thereof.

The nitrogen absorption specific surface area ($N_2SA$, measured according to JIS K 6217-2:2001) is not particularly limited and may be selected as appropriate depending on purpose, which may preferably be 20 to 100 $m^2$/g, and more preferably 35 to 80 $m^2$/g. The carbon black having the nitrogen absorption specific surface area ($N_2SA$) of 20 $m^2$/g or more improves durability of the resulting rubber composition providing sufficient crack growth resistance, and the carbon black having the nitrogen absorption specific surface area ($N_2SA$) of 100 $m^2$/g or less can maintain favorable workability while avoiding significant reduction in low loss property.

The rubber composition of the disclosure may use a crosslinking agent as necessary. The crosslinking agent may be selected as appropriate depending on purpose, and the examples thereof may include, without being particularly limited, for example, a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent, with the sulfur-based crosslinking agent (vulcanizing agent) being more preferred as the rubber composition for use in tires.

The crosslinking agent above may be contained preferably in a range of 0.1 to 20 parts by mass per 100 parts by mass of the rubber component, which may be selected as appropriate depending on purpose without being particularly limited. Crosslinking may hardly be progressed with the content of the crosslinking agent falling below 0.1 parts by mass, whereas the content exceeding 20 parts by mass tends to allow some of the crosslinking agent to inadvertently promote crosslinking during the kneading, which may also impair the physical property of the crosslinked product.

When using the vulcanizing agent, vulcanization accelerators may additionally be used in combination. Examples of the vulcanization accelerators may include a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound, and a xanthate-based compound. Further, the disclosed rubber composition may use, as necessary depending on the intended use, a softener, a crosslinking coagent, a colorant, a flame retarder, a lubricant, a foaming agent, a plasticizer, a processing aid, an antioxidant, an age resistor, an anti-scorch agent, an ultraviolet rays protecting agent, an antistatic agent, a color protecting agent, and other publicly-known compounding agents.

Moreover, the rubber composition according to the disclosure can be crosslinked to obtain a crosslinked rubber composition. The crosslinking conditions are not particularly limited and may be selected as appropriate depending on purpose, and the crosslinking may be performed preferably at a temperature of 120° C. to 200° C. over a warming time of 1 to 900 minutes. The crosslinked rubber composition thus obtained, which uses a conjugated diene compound as a monomer of the rubber component, is excellent in crosslinking property and thus has a higher mechanical property, as compared with a case of EPDM which uses a polymer having a non-conjugated diene compound as a monomer thereof.

<Tire>

A tire according to the present disclosure is characterized in that it is manufactured using the disclosed rubber composition described above. The tire is not particularly limited as long as the rubber composition containing the disclosed copolymer in the rubber component is used, and may be selected as appropriate depending on purpose. The tire uses the disclosed rubber composition, and thus can be manufactured with high workability, and has high durability. The disclosed rubber composition may be applied to any part of the tire with no particular limitation, which may be selected as appropriate depending on purpose. Examples thereof may include a tread, a base tread, a sidewall, a side reinforcing rubber, and a bead filler. Of those, the disclosed rubber composition may advantageously be used for a tread in terms of durability.

The aforementioned tire may be manufactured by a conventional method. The method may include, for example, sequentially applying and stacking, onto a tire molding drum, members generally used in manufacturing tires, such as a carcass layer, a belt layer, and a tread layer formed of an unvulcanized rubber composition and/or cords, removing the drum therefrom to provide a green tire, and then vulcanizing the green tire by heating using an ordinary method, to thereby manufacture a desired tire (for example, a pneumatic tire).

<Other Applications than in Tires>

The rubber composition containing the copolymer of the disclosure is applicable to vibration-insulating rubbers, seismic isolation rubbers, belts for conveyor belts, rubber crawlers, and various hoses or the like, other than to tires.

EXAMPLES

In the following, the present disclosure is described in detail with reference to Examples. However, the present disclosure is no way limited to Examples in below.

Synthesis Example 1: Copolymer A

To a sufficiently dried 30-ml pressure-resistant glass bottle, 1.88 g (20 mmol) of norbornene and 10 ml of toluene were added in a glove box under a nitrogen atmosphere, and the bottle was then closed with a cap. Next, the bottle was removed from the glove box, and 1.08 g (20 mmol) of 1,3-butadiene was added to the bottle to prepare a monomer solution.

On the other hand, 20 μmol of 1,3-tert-butyldimethylsilyl) indene, 20 μmol of tris(bis(dimethylsilyl)amide)gadolinium, 150 μmol of diisobutylaluminum hydride and 20 μmol of triphenylcarbonium tetrakis(pentafluorophenyl)borate [$Ph_3CB(C_6F_5)_4$] were added to a glass-made vessel in a glove box under a nitrogen atmosphere, and they were then dissolved in 5 ml of toluene to prepare a catalyst solution.

Thereafter, the catalyst solution was removed from the glove box, and was added to the monomer solution, followed by performing polymerization at room temperature for 5 minutes. After completion of the polymerization, 10 ml of a methanol solution of 10% by mass of BHT (2,6-bis(t-butyl)-4-methylphenol) was added thereto to stop the reaction. Subsequently, a large amount of a methanol/hydrochloric acid mixed solvent was further added thereto to separate a copolymer, and the copolymer was then vacuum-dried at 60° C. to obtain a copolymer A. The yield of the obtained copolymer A was 1.50 g.

Synthesis Comparative Example 1: Copolymer B

To a sufficiently dried 30-ml pressure-resistant glass bottle, 1.88 g (20 mmol) of norbornene and 10 ml of toluene were added in a glove box under a nitrogen atmosphere, and the bottle was then closed with a cap. Next, the bottle was removed from the glove box, and 1.08 g (20 mmol) of 1,3-butadiene was added to the bottle to prepare a monomer solution.

On the other hand, 20 μmol of bis(2-methylindenyl) scandium bis(trimethylsilylamide)[(2-MeC$_9$H$_6$)$_2$ScN (SiMe$_3$)$_2$], 20 μmol of triphenylcarbonium tetrakis(pentafluorophenyl)borate [Ph$_3$CB(C$_6$F$_5$)$_4$], and 150 μmol of diisobutylaluminum hydride were added to a glass-made vessel in a glove box under a nitrogen atmosphere, and they were then dissolved in 5 ml of toluene to prepare a catalyst solution.

Thereafter, the catalyst solution was removed from the glove box, and was added to the monomer solution, followed by performing polymerization at room temperature for 5 minutes. After completion of the polymerization, 10 ml of a methanol solution of 10% by mass of BHT (2,6-bis(t-butyl)-4-methylphenol) was added thereto to stop the reaction. Subsequently, a large amount of a methanol/hydrochloric acid mixed solvent was further added thereto to separate a copolymer, and the copolymer was then vacuum-dried at 60° C. to obtain a copolymer B. The yield of the obtained copolymer B was 1.10 g.

(Identification of Copolymers)

The obtained copolymers A and B were measured/evaluated for the microstructure and the glass transition temperature ($T_g$) by the following methods. The results are shown in Table 1.

(1) Microstructure

Microstructure in each polymer was obtained based on, for example, an integration ratio of the $^1$H-NMR spectrum (1,2-vinyl bond content) and the $^{13}$C-NMR spectrum (the content ratio of cis-1,4 bond and trans-1,4 bond).

Table 1 shows the content (%) of cis-1,4 bonds, the content (%) of trans-1,4 bonds and the content (%) of 1,2-vinyl bonds in the entire units derived from the conjugated diene compound, and the content (mol %) of a unit derived from the olefin compound other than the conjugated diene compound.

(2) Glass Transition Temperature ($T_g$)

The glass transition temperature of each polymer was measured using a differential scanning calorimeter (DSC, "DSCQ2000" manufactured by TA Instruments Japan Inc.) according to JIS K 0129.

TABLE 1

|  | Synthesis Example 1 Copolymer A | Synthesis Comparative Example 1 Copolymer B |
|---|---|---|
| Content (%) of cis-1,4 Bonds | 93.55 | 87.69 |
| Content (%) of trans-1,4 Bonds | 3.81 | 0.34 |
| Content (%) of 1,2-Vinyl Bonds | 2.64 | 11.97 |
| Content (mol %) of Unit derived from Olefin Compound | 11.4 | 5.7 |
| Glass Transition Temperature $T_g$ (° C.) | −100.3 | −96.8 |

From the results shown in Table 1, it was found that a copolymer of 1,3-butadiene and norbornene was obtained in both Synthesis Example 1 and Synthesis Comparative Example 1.

Moreover, it was found that the content of cis-1,4 bonds derived from the conjugated diene portion (1,3-butadiene) was higher in Synthesis Example 1. Further, from the yields of the copolymers A and B, it was found that the yield was also higher in Synthesis Example 1.

As a result, it was found that a copolymer with a high content of cis-1,4 bonds of the conjugated diene portion could be obtained at a high yield even when the cyclic olefin compound is used as a monomer in Synthesis Example 1.

INDUSTRIAL APPLICABILITY

According to a production method for a copolymer of the present disclosure, a copolymer with a high content of cis-1,4 bonds of a conjugated diene portion can be obtained at a high yield even when a cyclic olefin compound is used as a monomer. A copolymer of the present disclosure has a high content of cis-1,4 bonds of a conjugated diene portion even when a cyclic olefin compound is contained as a monomer. Moreover, a rubber composition of the present disclosure is excellent in workability and durability, and a tire of the present disclosure has high durability.

The invention claimed is:

1. A production method for a copolymer comprising a step of polymerizing a conjugated diene compound and a cyclic olefin compound in the presence of a catalyst composition containing a rare-earth element compound represented by the following formula (I), at least one compound selected from the group consisting of an ionic compound and a halogen compound, a compound represented by the following formula (II), and a coordination compound that can be a ligand:

$$M\text{-}(AQ^1)(AQ^2)(AQ^3) \qquad (I)$$

wherein M represents scandium, yttrium or a lanthanoid element, $AQ^1$, $AQ^2$ and $AQ^3$ represent functional groups that may be the same as or different from one another, and A represents nitrogen, oxygen or sulfur, at least one M-A bond being contained;

$$YR^1{}_aR^2{}_bR^3{}_c \qquad (II)$$

wherein Y represents a metal selected from the groups 1, 2, 12, and 13 of the periodic table, $R^1$ and $R^2$ each represent a hydrocarbon group containing 1 to 10 carbon atoms or a hydrogen atom, and $R^3$ represents a hydrocarbon group containing 1 to 10 carbon atoms, wherein $R^1$, $R^2$ and $R^3$ may be the same as or different from one another, and when Y is a metal selected from the group 1 of the periodic table, a is 1 and b and c are 0, when Y is a metal selected from the groups 2 and 12 of the periodic table, a and b are 1 and c is 0, and when Y is a metal selected from the group 13 of the periodic table, a, b and c are 1; and wherein the coordination compound is added in an amount of 0.1 to 1.2 mol to 1 mol of the rare-earth element compound.

2. The production method for a copolymer according to claim 1, wherein the coordination compound is a compound having a cyclopentadiene skeleton.

3. The production method for a copolymer according to claim 2, wherein the compound having a cyclopentadiene skeleton is selected from substituted or unsubstituted cyclopentadiene, substituted or unsubstituted indene, and substituted or unsubstituted fluorene.

4. The production method for a copolymer according to claim 2, wherein the compound having a cyclopentadiene skeleton is a substituted phenylindenyl compound.

5. The production method for a copolymer according to claim 1, wherein the cyclic olefin compound is at least one selected from the group consisting of norbornene, dicyclopentadiene, norbornadiene, cyclohexene and ethylidene norbornene.

6. The production method for a copolymer according to claim 1, wherein the conjugated diene compound is 1,3-butadiene.

7. The production method for a copolymer according to claim 2, wherein the cyclic olefin compound is at least one selected from the group consisting of norbornene, dicyclopentadiene, norbornadiene, cyclohexene and ethylidene norbornene.

8. The production method for a copolymer according to claim 2, wherein the conjugated diene compound is 1,3-butadiene.

9. The production method for a copolymer according to claim 3, wherein the cyclic olefin compound is at least one selected from the group consisting of norbornene, dicyclopentadiene, norbornadiene, cyclohexene and ethylidene norbornene.

10. The production method for a copolymer according to claim 3, wherein the conjugated diene compound is 1,3-butadiene.

11. The production method for a copolymer according to claim 4, wherein the cyclic olefin compound is at least one selected from the group consisting of norbornene, dicyclopentadiene, norbornadiene, cyclohexene and ethylidene norbornene.

12. The production method for a copolymer according to claim 4, wherein the conjugated diene compound is 1,3-butadiene.

13. The production method for a copolymer according to claim 5, wherein the conjugated diene compound is 1,3-butadiene.

14. The production method for a copolymer according to claim 1, wherein the additive amount of the coordination compound is an equivalent amount (1.0 mol) to the rare-earth element compound.

15. A copolymer produced by the production method for a copolymer according to claim 1, wherein the content of unit derived from the cyclic olefin compound is 11.4 mol % or more, and the content (%) of 1,2-vinyl bonds is 2.64% or more.

16. The copolymer according to claim 15, wherein the content (%) of trans-1,4 bonds is 3.81% or more.

* * * * *